United States Patent
Kamepalli et al.

(10) Patent No.: US 11,568,729 B2
(45) Date of Patent: *Jan. 31, 2023

(54) INFORMATION HANDLING SYSTEM WITH CONSOLIDATED EXTERNAL USER PRESENCE DETECTION

(71) Applicant: DELL PRODUCTS L.P., Round Rock, TX (US)

(72) Inventors: Srinivas Kamepalli, Austin, TX (US); Daniel L. Hamlin, Round Rock, TX (US)

(73) Assignee: Dell Products L.P., Round Rock, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 17/541,386

(22) Filed: Dec. 3, 2021

(65) Prior Publication Data
US 2022/0262223 A1    Aug. 18, 2022

Related U.S. Application Data

(63) Continuation of application No. 17/174,694, filed on Feb. 12, 2021, now Pat. No. 11,222,518.

(51) Int. Cl.
*H04B 7/00*  (2006.01)
*G08B 21/02* (2006.01)
*G08B 29/00* (2006.01)
*G08B 21/22* (2006.01)

(52) U.S. Cl.
CPC ....... *G08B 21/0227* (2013.01); *G08B 21/023* (2013.01); *G08B 21/22* (2013.01); *G08B 29/00* (2013.01)

(58) Field of Classification Search
CPC .. G08B 21/0227; G08B 21/023; G08B 21/22; G08B 29/00; Y02D 10/00; G06F 1/3231; G06F 1/325; G06F 1/07; H04N 5/33; H04L 63/083
See application file for complete search history.

(56) References Cited

U.S. PATENT DOCUMENTS

| | | | |
|---|---|---|---|
| 7,539,508 B2 * | 5/2009 | Bahl ................. | G06F 1/3203 455/343.1 |
| 10,819,920 B1 | 10/2020 | Hamlin et al. | |
| 11,222,518 B1 * | 1/2022 | Kamepalli ......... | G08B 21/0227 |
| 11,258,671 B1 * | 2/2022 | Vora .................. | G10L 15/30 |

(Continued)

*Primary Examiner* — An T Nguyen
(74) *Attorney, Agent, or Firm* — Larson Newman, LLP

(57) ABSTRACT

An information handling system includes a host device and multiple monitor devices. One of the monitor devices is configured as a parent monitor device, and the remaining monitor devices are configured as child monitor devices. The parent monitor device receives a user presence detect (UPD) status signal, and queries all of the child monitor devices for a current UPD status. In response to the queries, the parent monitor consolidates the current UPD status from each of the child monitor devices and the current UPD status of the parent monitor device. Based on the consolidated current UPD status and based on a UPD policy, the parent monitor device sets a current user status as a user absence or presence. In response to the processor being in a low power state and the current user status being the user presence, the patent monitor device provides a wake notification to the host device.

20 Claims, 9 Drawing Sheets

(56) References Cited

U.S. PATENT DOCUMENTS

| | | |
|---|---|---|
| 2003/0198196 A1 | 10/2003 | Bahl et al. |
| 2009/0282276 A1 | 11/2009 | Learmonth et al. |
| 2013/0086206 A1 | 4/2013 | Sultenfuss et al. |
| 2013/0171939 A1* | 7/2013 | Tian .................. H04W 12/04 455/41.2 |
| 2014/0075230 A1* | 3/2014 | Suggs ................ G06F 1/3231 713/323 |
| 2014/0270096 A1 | 9/2014 | Ashizuka |
| 2015/0135021 A1 | 5/2015 | Robison et al. |
| 2016/0155443 A1* | 6/2016 | Khan .................. G10L 15/22 704/275 |
| 2016/0300467 A1 | 10/2016 | Warren et al. |
| 2019/0332813 A1 | 10/2019 | Berthet et al. |
| 2022/0057854 A1* | 2/2022 | Karanje .............. G06F 1/3234 |

* cited by examiner

INFORMATION HANDLING SYSTEM WITH CONSOLIDATED EXTERNAL USER PRESENCE DETECTION

CROSS-REFERENCE TO RELATED APPLICATION

This application is a Continuation of U.S. patent application Ser. No. 17/174,694 entitled "INFORMATION HANDLING SYSTEM WITH CONSOLIDATED EXTERNAL USER PRESENCE DETECTION" filed on Feb. 12, 2021, the disclosure of which is hereby expressly incorporated by reference in its entirety.

FIELD OF THE DISCLOSURE

The present disclosure generally relates to information handling systems, and more particularly relates to consolidated external user presence detection.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a host device and multiple monitor devices. The host device includes a processor. Each of the monitor devices includes a different presence detect sensor. One of the monitor devices may be configured as a parent monitor device, and the remaining monitor devices may be configured as child monitor devices. The parent monitor device may receive a user presence detect (UPD) status signal. The parent monitor device may query all of the child monitor devices for a current UPD status. In response to the queries, the parent monitor may consolidate the current UPD status from each of the child monitor devices and the current UPD status of the parent monitor device. Based on the consolidated current UPD status and based on a UPD policy, the parent monitor device may set a current user status as either a user absence or a user presence. In response to the processor being in a low power state and the current user status being the user presence, the parent monitor device may provide a wake notification to the host device.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
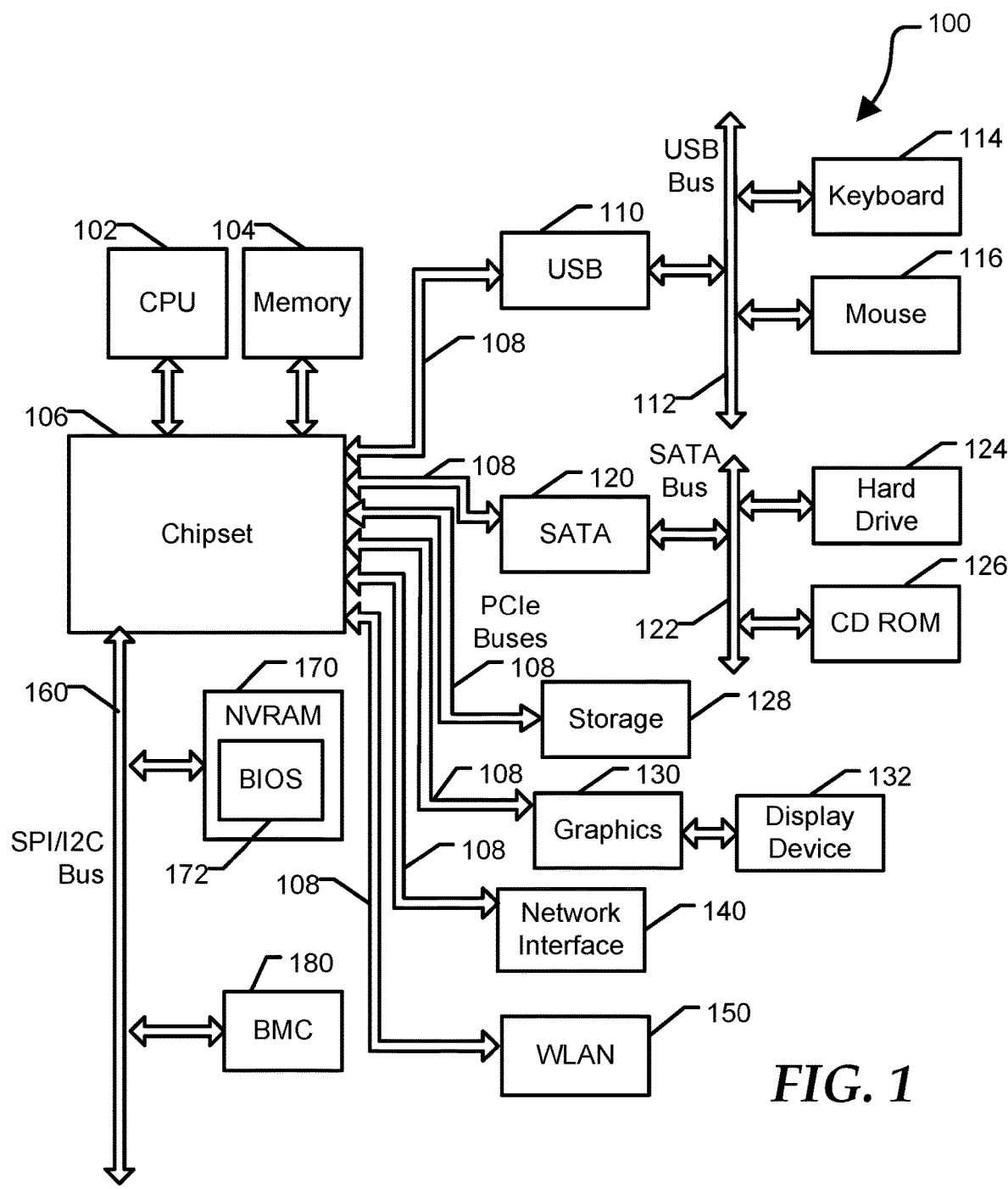
FIG. 1 is a block diagram of a general information handling system according to at least one embodiment of the present disclosure.

FIG. 1 illustrates a general information handling system 100. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various other I/O devices, such as a keyboard, a mouse, and a video display. The information handling system may also include one or more busses operable to transmit communications between the various hardware components.

Information handling system 100 including a processor 102, a memory 104, a chipset 106, one or more PCIe buses 108, a universal serial bus (USB) controller 110, a USB bus 112, a keyboard device controller 114, a mouse device controller 116, a configuration a SATA bus controller 120, a SATA bus 122, a hard drive device controller 124, a compact disk read only memory (CD ROM) device controller 126, a storage 128, a graphics device controller 130, a network interface controller (NIC) 140, a wireless local area network (WLAN) or wireless wide area network (WWAN) controller 150, a serial peripheral interface (SPI) bus 160, a NVRAM 170 for storing BIOS 172, and a baseboard management controller (BMC) 180. In an example, chipset 106 may be directly connected to an individual end point via a PCIe root port within the chipset and a point-to-point topology as shown in FIG. 1. BMC 180 can be referred to as a service processor or embedded controller (EC). Capabilities and functions provided by BMC 180 can vary considerably based on the type of information handling system. For example, the term baseboard management system is often used to describe an embedded processor included at a server, while an embedded controller is more likely to be found in a consumer-level device. As disclosed herein, BMC 180 represents a processing device different from CPU 102, which provides various management functions for information handling system 100. For example, an embedded controller may be responsible for power management, cooling management, and the like. An embedded controller included at a data storage system can be referred to as a storage enclosure processor.

System 100 can include additional processors that are configured to provide localized or specific control functions, such as a battery management controller. Bus 160 can include one or more busses, including a SPI bus, an I2C bus, a system management bus (SMBUS), a power management bus (PMBUS), and the like. BMC 180 can be configured to provide out-of-band access to devices at information handling system 100. As used herein, out-of-band access herein refers to operations performed prior to execution of BIOS 172 by processor 102 to initialize operation of system 100.

BIOS 172 can be referred to as a firmware image, and the term BIOS is herein used interchangeably with the term firmware image, or simply firmware. BIOS 172 includes instructions executable by CPU 102 to initialize and test the hardware components of system 100, and to load a boot loader or an operating system (OS) from a mass storage device. BIOS 172 additionally provides an abstraction layer for the hardware, such as a consistent way for application programs and operating systems to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device.

Information handling system 100 can include additional components and additional busses, not shown for clarity. For example, system 100 can include multiple processor cores, audio devices, and the like. While a particular arrangement of bus technologies and interconnections is illustrated for the purpose of example, one of skill will appreciate that the techniques disclosed herein are applicable to other system architectures. System 100 can include multiple CPUs and redundant bus controllers. One or more components can be integrated together. For example, portions of chipset 106 can be integrated within CPU 102. Additional components of information handling system 100 can include one or more storage devices that can store machine-executable code, one or more communications ports for communicating with external devices, and various input and output (I/O) devices, such as a keyboard, a mouse, and a video display. An example of information handling system 100 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Figure 2:
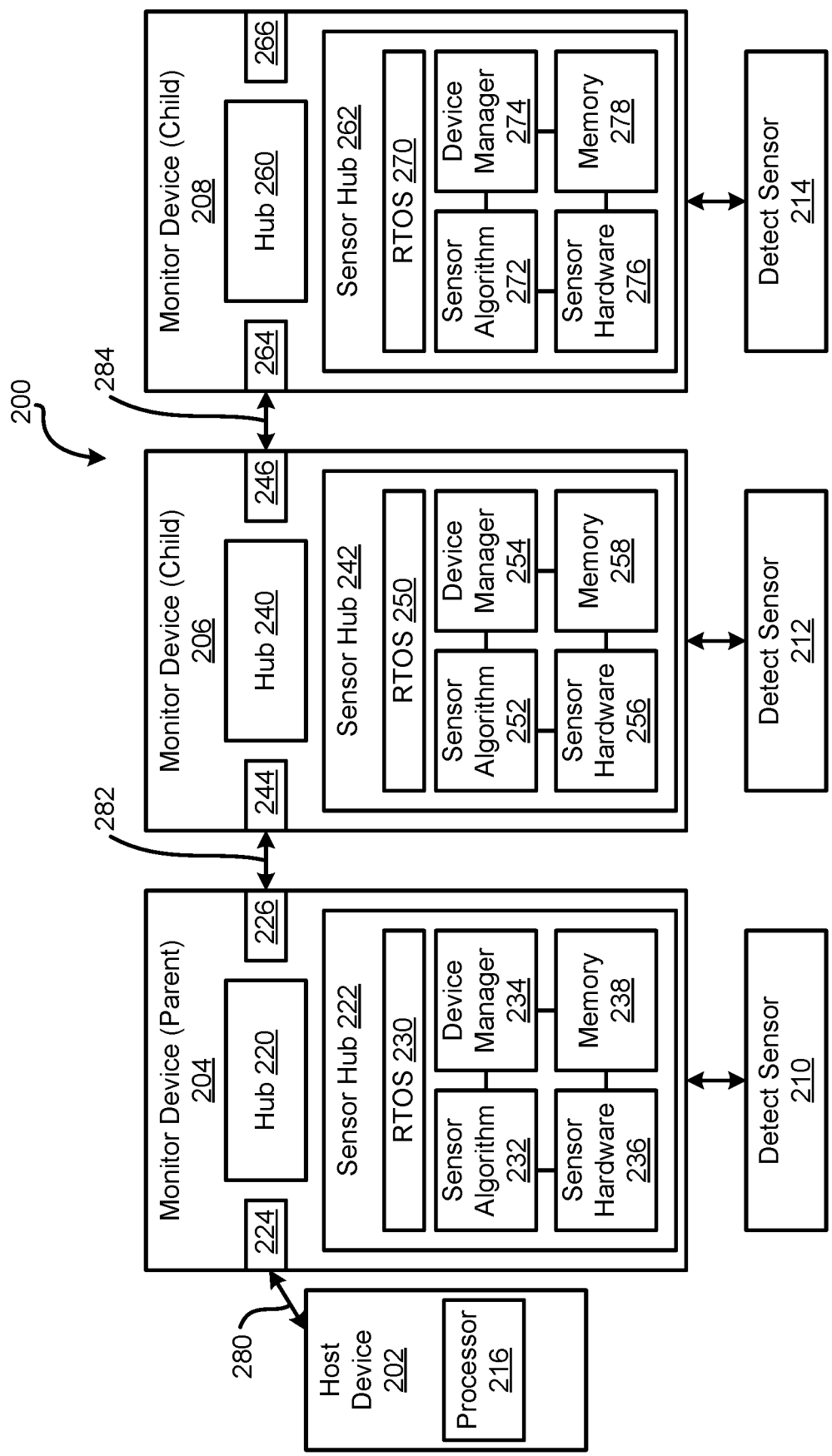
FIG. 2 is a block diagram of an information handling system according to at least one embodiment of the disclosure.

In an example, information handling system 100 may be any suitable device including, but not limited to, compute device 202 of FIG. 2. Information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

FIG. 2 illustrates an information handling system 200 according to at least one embodiment of the disclosure. Information handling system 200 includes a host device 202, monitor devices 204, 206, and 208, and detect sensors 210, 212, and 214. In an example, any component within FIG. 2, such as host device 202 and monitor devices 204, 206, and 208, may be an information handling system substantially similar to information handling system 100 of FIG. 1. Monitor devices 204, 206, and 208 may be device monitors and each of the monitor devices may be associated with a different detect sensor. For example, monitor device 204 may include or be connected to detect sensor 210, monitor device 206 may include or be connected to detect sensor 212, and monitor device 208 may include or be connected to detect sensor 214. Monitor devices 204, 206, and 208 may be any suitable device connected to host device 202. For example, monitor devices 204, 206, and 208 may be, but are not limited to, external displays, docks, and speaker phone pucks.

Host device 202 includes a processor 216. Monitor device 204 includes a hub 220, a real-time operating system (RTOS) 230, a sensor hub 222, and ports 224 and 226. Sensor hub 222 includes a sensor algorithm driver 232, a device manager 234, sensor hardware driver 236, and a memory 238. Monitor device 206 includes a hub 240, an RTOS 250, a sensor hub 242, and ports 244 and 246. Sensor hub 242 includes a sensor algorithm driver 252, a device manager 254, sensor hardware driver 256, and a memory 258. Monitor device 208 includes a hub 260, an RTOS 270, a sensor hub 262, and ports 264 and 266. Sensor hub 262 includes a sensor algorithm driver 272, a device manager 274, sensor hardware driver 276, and a memory 278. In an example, host device 202 and monitor devices 204, 206, and 208 may include additional components beyond those shown in FIG. 2 without varying from the scope of this disclosure.

In an example, host device 202 and monitor devices 204, 206, and 208 may be connected together for communication in any suitable manner. For example, host device 202 may be connected to monitor device 204 via a physical cable 280. In an example, physical cable 280 may be connected to port 224 of monitor device 204. Monitor devices 204, 206, and 208 may be connected in any suitable manner including, but not limited to, a sequential or daisy chain manner. For example, monitor device 204 is connected to monitor device 206, which in turn is connected to monitor device 208. In an example, a physical cable 282 is connected between port 226 of monitor device 204 and port 244 of monitor device 206. Similarly, a physical able 284 is connected between port 246 of monitor device 206 and port 264 of monitor device 208. In certain examples, information handling system 200 may include additional monitor devices without varying from the scope of this disclosure. In this example, another monitor device may be connected to port 266 of monitor device 208 via a physical cable. In an example, hubs 220, 240, and 260, ports 224, 226, 244, 246, 264, and 266, and physical cables 280, 282, and 284 may implement any suitable communication protocol including, but not limited to, universal serial bus (USB) type-C.

In previous information handling systems, a user detection by any of monitor devices 204, 206, and 208 would wake host device 202 so that processor 216 may determine if the user detection is authentic. In these previous information handling systems the processor of the host device would perform process the user detection signals and consolidate the user detection signals. These operations by the processor of the host device increase power demands and operating processing within the host device. When a previous information handling system is in a high traffic area, the number of wake up operations and false positive user detection would be increased. Information handling system 200 may utilize a parent monitor device, such as monitor device 204, to perform the processing, consolidation, and authentication of a user detection from one or more of monitor devices 204, 206, and 208. The offloading of operations to the parent monitor device may improve information handling system 200 by reducing power consumption and operations within host device 202.

During operation of host device 202, processor 216 may detect one or more of monitor devices 204, 206, and 208 as being in communication with the host device. The communication may be the result of any suitable operation including, but not limited to, each of monitor devices 204, 206, and 208 being successively connected to host device 202, and each of the monitoring devices being successively powered on. In an example, one of monitor devices 204, 206, and 208 may be set up as a parent device, and the other monitor devices may be set up a child devices. In certain examples, the first monitor device detected to be in communication with host device 202 may be set up as the parent device, and the other devices may be set up as child devices. For example, processor 216 may first detect monitor device 204, and set up monitor device 204 as the parent device. Processor 216 may then set up monitor devices 206 and 208 as child devices. In certain examples, the parent device may be any monitor device in the daisy chain and the parent device may be determined by any suitable manner without varying from the scope of this disclosure. For example, the parent device may be determined by the first monitor device detected, by the first monitor device to detect a user, or the like. In certain examples, the parent monitor device may also be referred to as the coordination monitor device.

For clarity and brevity, the operation of monitor devices 204, 206, and 208 will be described with respect to hub 220, sensor hub 222, and ports 224 and 226 of monitor device 204. One of ordinary skill in the art will recognize that hub 240, sensor hub 242, and ports 244 and 246 within monitor device 206, and hub 260, sensor hub 262, and ports 264 and 266 within monitor device 208 may substantially similar to hub 220, sensor hub 230, and ports 224 and 226 of monitor device 204.

Hub 220 may perform one or more suitable operations to check data prior to the data being sent to host device 202. For example, hub 220 may operate as a sensor arbiter to collect sensor data from both sensor hub 240 and 260, and provide that data to sensor hub 222. Based on this collection of sensor data from child devices 206 and 208 and respective detect sensors 212 and 214, hub 220 may ensure that the sensor data is evaluated within sensor hub 222 perform the data and/or a wake signal is provided to host device 202.

RTOS 230 may access data and code stored within sensor algorithm driver 232, device manager 234, sensor hardware driver 236, and memory 238. In an example, sensor algorithm driver 232 may store data indicating a percentage of confidence threshold that is needed to verify a user has been identified by detect sensor 210. In certain examples, the percentage of confidence threshold may any suitable percentage including, but not limited to, seventy-five percent, eighty percent, ninety percent, and ninety-eight percent.

Device manager 234 may store any suitable data corresponding to monitor device 204. For example, the data within device manager 234 may include, but is not limited to, a designation of whether monitor device 204 is the parent device or a child device, configuration data for the monitor device, and a device status. In an example, the device status may indicate whether monitor device 204 is powered on or off, whether the monitor device has detected a user, or the like.

In certain examples, sensor hardware driver 236 may enable RTOS 230 to perform one or more suitable operations to receive and analyze data from detect sensor 210. In an example, RTOS 230 may utilize sensor hardware driver 236 to communicate with detect sensor 210, to determine whether a user is located within the field of view of the detect sensor, and to calculate a percentage of confidence of whether the user is within the field of view.

Memory 238 may store policy data for the consolidated chain of monitor devices 204, 206, and 208. In certain examples, processor 216 may execute firmware to set the policies for user detection and wake up within information handling system 200. In an example, the policy data may indicate a security level for user detection and a number of monitor devices within information handling system 200.

For example, the policy data may indicate any one of a number of security levels including but not limited to, a low security level, a medium security level, and a high security level.

The different security levels may set a number of monitor devices 204, 206, and 208 that must detect a user before a user presence signal is reported to processor 216 of host device 202. For example, when monitor device 204 is set to a low security level, the user presence signal is reported if any of detect sensors 210, 212, and 214 detect a user. The policy data may also indicated that if all detect sensors 210, 212, and 214 do not detect a user, a user absence signal is provided to processor 216 of host device 202. When monitor device 204 is set to a medium security level, the user presence signal is reported if at least two of detect sensors 210, 212, and 214 detect a user. The policy data may also indicated that if two or more detect sensors 210, 212, and 214 do not detect a user, the user absence signal is provided to processor 216 of host device 202. When monitor device 204 is set to a secure or high security level, the user presence signal is reported if all of detect sensors 210, 212, and 214 detect a user. The policy data for the high security level may also indicate that if any one of detect sensors 210, 212, and 214 does not detect a user, the user absence signal is provided to processor 216 of host device 202.

During operations, parent monitor device 204 may provide the policy information set by processor 216 to child monitor devices 206 and 208. In an example, child monitor devices 206 and 208 may store the policy data in respective memories 258 and 278. In certain examples, parent monitor device 204 may also provide other configuration settings, device management settings, and presence detection logic settings to child monitor devices 206 and 208. In an example, presence detection settings set by parent monitor device 204 may include any suitable settings including, but not limited to, angle or orientation for detect sensors 210, 212, and 214, and priority settings of monitor devices.

Processor 216 may perform discovering for monitor devices 204, 206, and 208 during any suitable operation within information handling system 200. For example, the discovery may be performed during a boot up operation of information handling system 200, during a hot plug event of one of monitor devices 204, 206, and 208, or the like. During the discover, processor 216 may assign one of monitor devices 204, 206, and 208 as the parent monitor device, and the other monitor devices a child monitor devices as described above.

In an example, parent monitor device 204 may provide the presence detection signal to processor 216 via any suitable notification including, but not limited to, a USB-C notification. In certain examples, parent monitor device 204 may provide different types of USB-C notifications based on a current power state of processor 216 and host device 202. For example, if processor 216 is operating in a runtime or S0 power state, parent monitor device 204 may assert a USB-C notification from port 224 over cable 280 to host device 202, and processor 216 may directly capture the USB-C notification. If processor 216 is in an MS power state, parent monitor device 204 may assert a USB-C notification, the notification may be captured as a USB device wake event, and then provided to processor 216 for operation. If processor 216 is in a sleep/hibernation or S4/S5 power state, parent monitor device 204 may assert the user presence notification as a USB-C vendor defined message (VDM). In response to the USB-C VDM being received at host device 202, an embedded controller of the host device may perform a wake up operation of processor 216 and the other components of the host device. User detection and verification operations will be discussed with respect to FIGS. 3-9 below.

FIGS. 3-9 illustrate an information handling system 300 including a host device 302, monitor devices/detect sensors (MD/DS) 304, 306, and 308 according to at least one embodiment of the disclosure. In an example, each MD/MS 304, 306, and 308 may be substantially similar to a different monitor device combined with a detect sensor, such as monitor device 204 combined with detect sensor 210 of FIG. 2, monitor device 206 combined with detect sensor 212 of FIG. 2, and monitor device 208 combined with detect sensor 214 of FIG. 2. For simplicity, MD/MS 304, 306, and 308 will be referred to herein as monitor devices. In an example, monitor devices 304, 306, and 308 may be connected in a daisy chain configuration, such that the monitor devices are consolidated with respect to host device 302.

Monitor device 304 has a field of view 320, monitor device 306 has a field of view 322, and monitor device 308 has a field of view 324. In certain examples, one or more of monitor devices 304, 306, and 308 may detect a user within its respective field of view 320, 322, and 324 and provide a notification to parent monitor device 304. In response to the notification from one child monitor device, parent monitor device 304 may solicit each child of monitor devices 306 and 308 for a current user presence detect (UPD) status for that child monitor device. In response, each of child monitor devices 306 and 308 may return the current UPD status as determined from the detect sensor of the child monitor device. Parent monitor device 304 may also determine the current UPD status for the detect sensor associated with the parent monitor device.

In an example, parent monitor device 304 may consolidate its own current UPD status information with the current UPD status information from both of child devices 306 and 308. Monitor device 304 may determine whether a user is present based on policy information and the consolidated UPD status information. The determination of user presence may depend on any suitable policy information including, but not limited to, a security level for information handling system 300 and a confidence percentage threshold for a user detection. In an example, the percentage of confidence threshold may any suitable percentage including, but not limited to, seventy-five percent, eighty percent, ninety percent, and ninety-eight percent. If information handling system 300 is set to a low security level, parent monitor device 304 may determine user presence if at least one of monitor devices 304, 306, and 308 provide a current UPD status of user 310 detected. Alternatively, parent monitor device 304 may determine a user absence if all monitor devices 304, 306, and 308 provide a current UPD status of no user 310 detected. The determination of user presence or absence with a low security level is shown in Table 1 below.

TABLE 1

| UPD Status | Parent Device 304 | Child Device 306 | Child Device 308 |
| --- | --- | --- | --- |
| User Presence | Present >90% | Any | Any |
| User Presence | Any | Present >90% | Any |
| User Presence | Any | Any | Present >90% |
| User Absence | Absent >90% | Absent >90% | Absent >90% |

If all of monitor devices 304, 306, and 308 have a current UPD status of no user 310 detected with a percentage confidence level above the percentage of confidence threshold, parent monitor device 304 may determine a UPD status of user absence.

Figure 3:
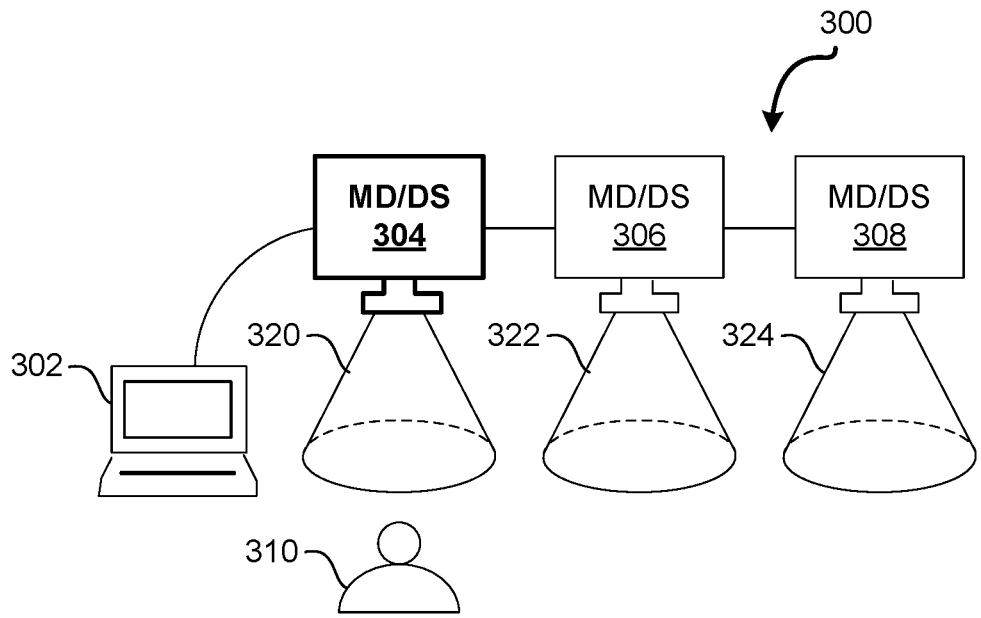
FIGS. 3-9 are diagrams of a consolidation of multiple user presence detect sensors according to at least one embodiment of the disclosure.

As shown in FIG. 3, parent monitor device 304 is in 'bold' to indicate that parent monitor device has a current UPD status of user present and the percentage of confidence may be above the percentage of confidence threshold. Therefore, as shown in row 1 of Table 1, the UPD status is user presence when parent monitor device 304 has a UPD status of user present and the percentage of confidence is above the percentage of confidence threshold. In this situation, the UPD status of child monitor devices 306 and 308 does not matter in a low security level.

Figure 4:
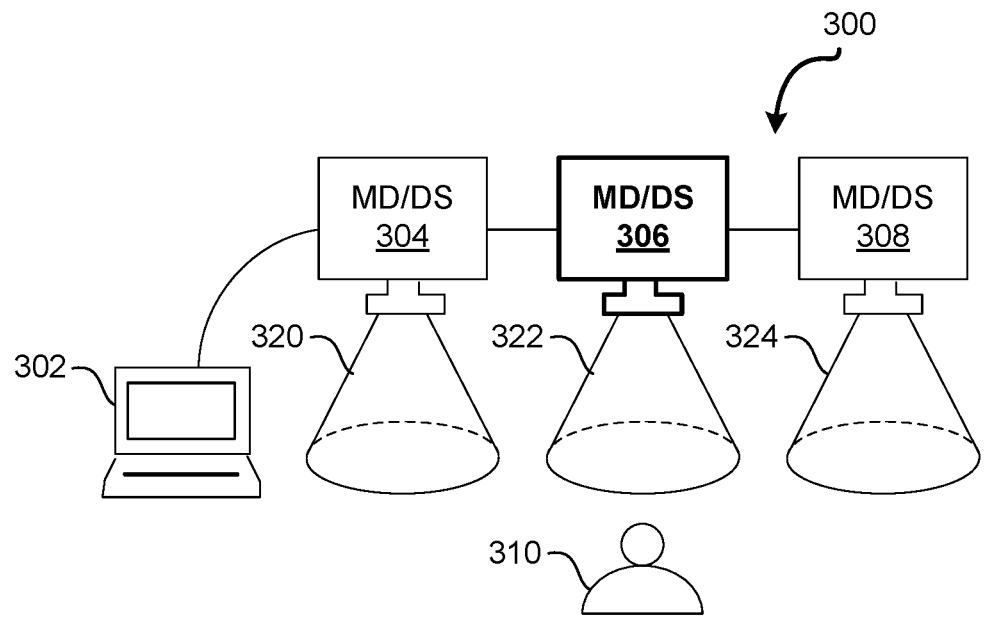

Referring now to FIG. 4, child monitor device 306 is in 'bold' to indicate that the child monitor device has a current UPD status of user present and the percentage of confidence may be above the percentage of confidence threshold. Therefore, as shown in row 2 of Table 1, the UPD status is user presence when child monitor device 306 has a UPD status of user present and the percentage of confidence is above the percentage of confidence threshold. In this situation, the UPD status of child monitor device 308 does not matter in a low security level.

Figure 5:
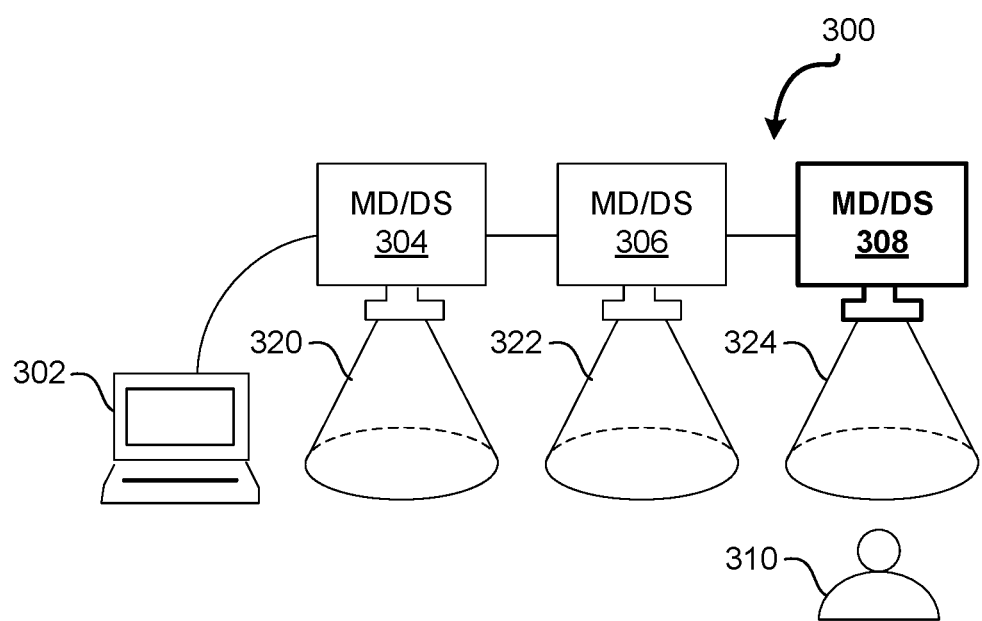

Referring now to FIG. 5, child monitor device 308 is in 'bold' to indicate that the child monitor device has a current UPD status of user present and the percentage of confidence may be above the percentage of confidence threshold. Therefore, as shown in row 3 of Table 1, the UPD status is user presence when child monitor device 308 has a UPD status of user present and the percentage of confidence is above the percentage of confidence threshold. In this situation, the UPD status of parent monitor device 304 and child monitor device 306 does not matter in a low security level.

Figure 6:
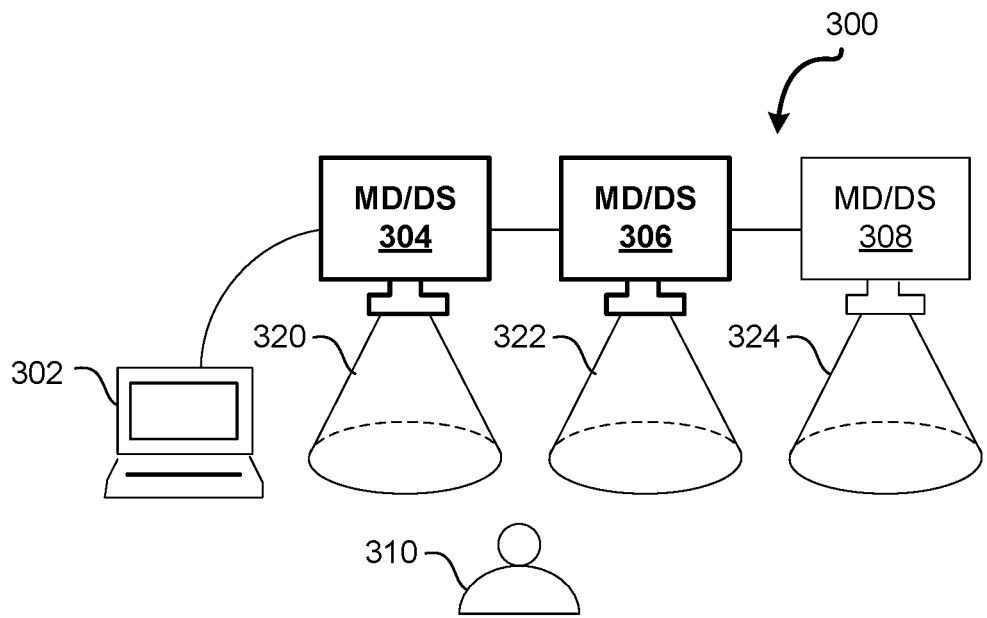

Referring now to FIG. 6, if information handling system 300 is set to a medium security level, parent monitor device 304 may determine user presence if two or more of monitor devices 304, 306, and 308 provide a current UPD status of user 310 detected. Alternatively, parent monitor device 304 may determine a user absence if two or more of monitor devices 304, 306, and 308 provide a current UPD status of no user 310 detected. The determination of user presence or absence with a medium security level is shown in Table 2 below.

TABLE 2

| UPD Status | Parent Device 304 | Child Device 306 | Child Device 308 |
| --- | --- | --- | --- |
| User Presence | Present >90% | Present >90% | Any |
| User Presence | Any | Present >90% | Present >90% |
| User Presence | Present >90% | Any | Present >90% |
| User Absence | Absent >90% | Absent >90% | Any |
| User Absence | Absent >90% | Any | Absent >90% |
| User Absence | Any | Absent >90% | Absent >90% |

If any two of monitor devices 304, 306, and 308 have a current UPD status of no user 310 detected with a percentage confidence level above the percentage of confidence threshold, parent monitor device 304 may determine a UPD status of user absence as shown in rows 4-6 of Table 2.

As shown in FIG. 6, parent monitor device 304 and child monitor device 306 are in 'bold' to indicate that these monitor devices have a current UPD status of user present and the percentage of confidence may be above the percentage of confidence threshold. Therefore, as shown in row 1 of Table 2, the UPD status is user presence when parent monitor device 304 and child monitor device 306 have a UPD status of user present and the percentage of confidence is above the percentage of confidence threshold. In this situation, the UPD status of child monitor device 308 does not matter in a medium security level.

Figure 7:
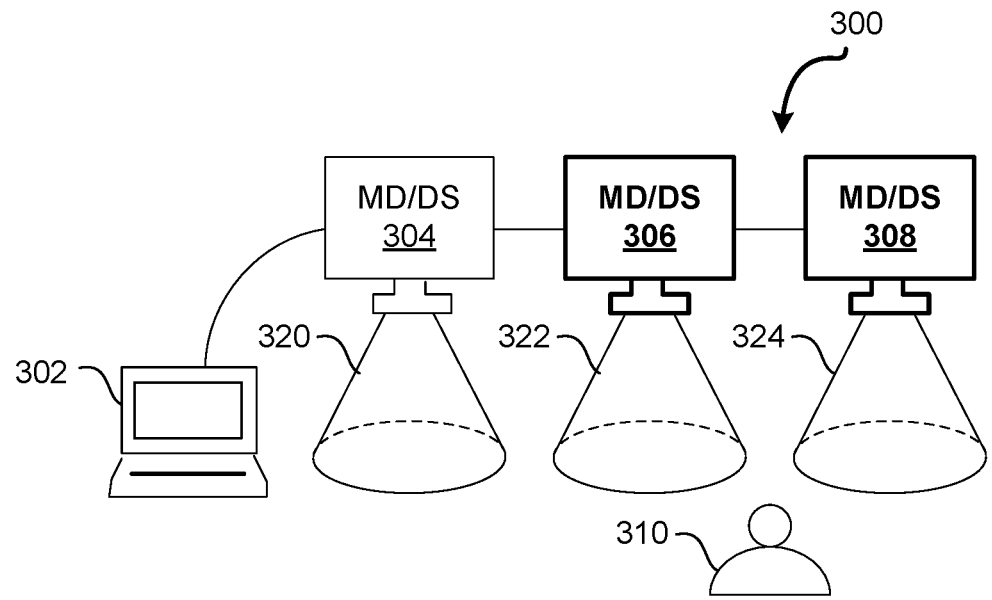

Referring now to FIG. 7, child monitor devices 306 and 308 are in 'bold' to indicate that the child monitor devices have a current UPD status of user present and the percentage of confidence may be above the percentage of confidence threshold. Therefore, as shown in row 2 of Table 2, the UPD status is user presence when child monitor devices 306 and 308 have a UPD status of user present and the percentage of confidence is above the percentage of confidence threshold. In this situation, the UPD status of parent monitor device 304 does not matter in a medium security level.

Figure 8:
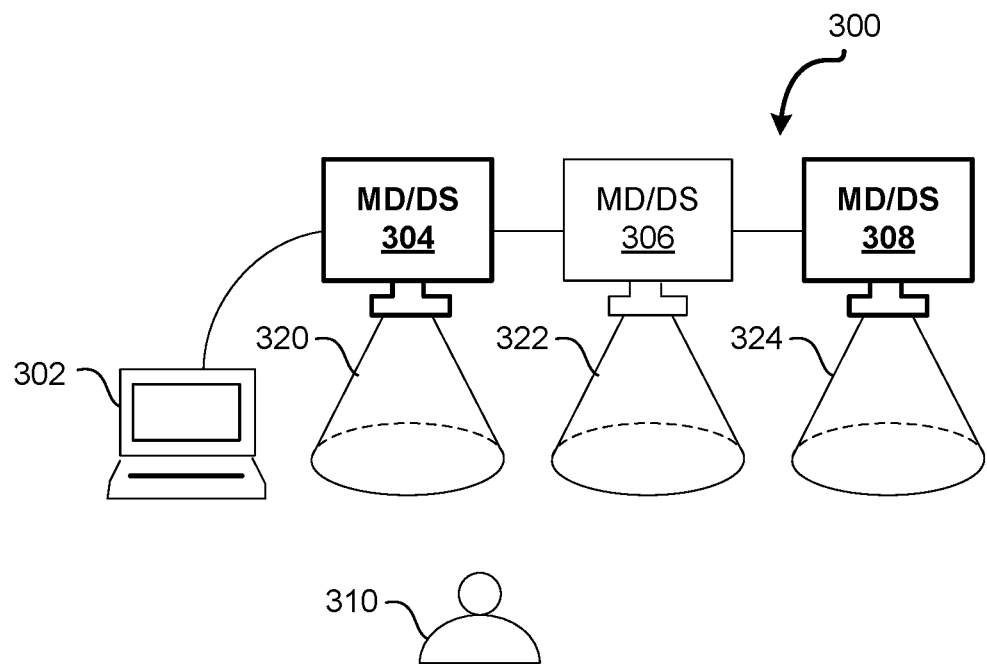

Referring now to FIG. 8, parent monitor device 304 and child monitor device 308 are in 'bold' to indicate that the parent monitor device and the child monitor device have a current UPD status of user present and the percentage of confidence may be above the percentage of confidence threshold. Therefore, as shown in row 3 of Table 2, the UPD status is user presence when parent monitor device 304 and child monitor device 308 has a UPD status of user present and the percentage of confidence is above the percentage of confidence threshold. In this situation, the UPD status of child monitor device 306 does not matter in a medium security level.

Figure 9:
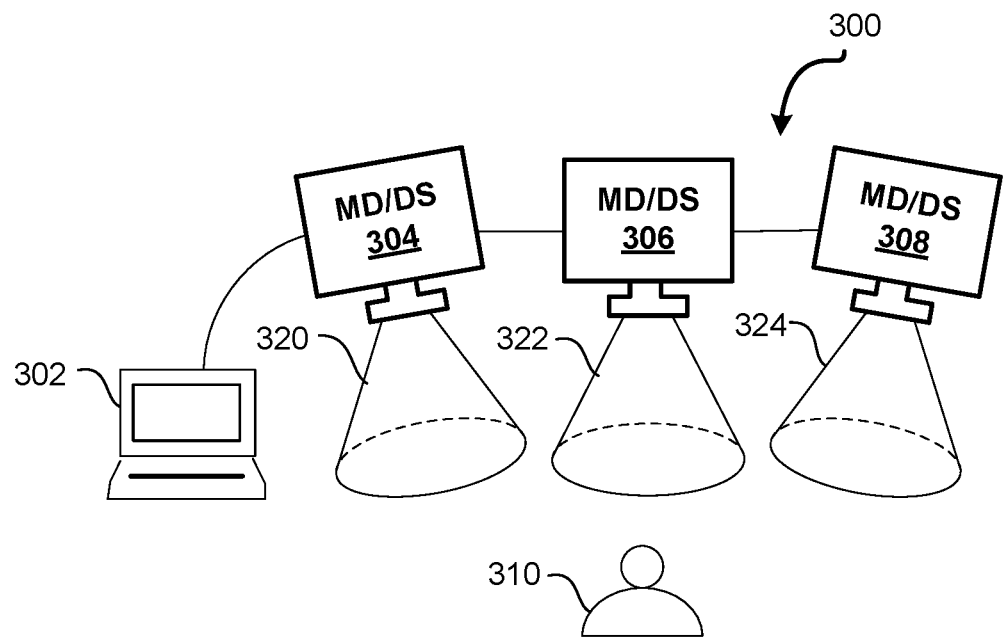

Referring now to FIG. 9, if information handling system 300 is set to a high or secure security level, parent monitor device 304 may determine user presence only if all of monitor devices 304, 306, and 308 provide a current UPD status of user 310 detected. Alternatively, parent monitor device 304 may determine a user absence if at least one of monitor devices 304, 306, and 308 provide a current UPD status of no user 310 detected. The determination of user presence or absence with a high or secure security level is shown in Table 3 below.

TABLE 3

| UPD Status | Parent Device 304 | Child Device 306 | Child Device 308 |
| --- | --- | --- | --- |
| User Presence | Present >90% | Present >90% | Present >90% |
| User Absence | Absent >90% | Any | Any |
| User Absence | Any | Absent >90% | Any |
| User Absence | Any | Any | Absent >90% |

As shown in FIG. 9, all monitor devices 304, 306, and 308 are in 'bold' to indicate that these monitor devices have a current UPD status of user present and the percentage of confidence may be above the percentage of confidence threshold. Therefore, as shown in row 1 of Table 3, the UPD status is user presence when all of monitor devices 304, 306, and 308 have a UPD status of user present and the percentage of confidence is above the percentage of confidence threshold. If at least one of monitor devices 304, 306, and 308 have a current UPD status of no user 310 detected with a percentage confidence level above the percentage of confidence threshold, parent monitor device 304 may determine a UPD status of user absence as shown in rows 3-4 of Table 3.

Upon parent monitor device 304 determining a user presence or a user absence, the parent monitor device may perform one or more suitable operations based on a current power state of host device 302. If host device 302 is in an MS power state or a sleep/hibernation S4/S5 power state and parent monitor device 304 determines a user absence UPD status, the parent monitor device does not provide a notification to the host device. In this situation, parent monitor device 304 may provide a low power idle command to child monitor devices 306 and 308. If host device 302 is operating in a runtime or S0 power state and parent monitor device 304 determines a user absence UPD status, the parent monitor device may assert a USB-C absence notification. In response to the absence notification, host device 302 may transition from the runtime power state to a lower power sleep/hibernation state.

If host device 302 is in the MS power state and parent monitor device 304 determines a user presence UPD status, the parent monitor device may assert a USB-C wake notification to the host device. In an example, host device 302 may capture the notification as a USB device wake event to wake the host device and initiate a login operation. If host device 302 is in a sleep/hibernation or S4/S5 power state and parent monitor device 304 determines a user presence UPD status, the parent monitor device may assert the user presence notification as a USB-C VDM. In response to the USB-C VDM being received at host device 302, an embedded controller of the host device may perform a wake up operation of the components of the host device. If host device 302 is operating in a runtime or S0 power state and parent monitor device 304 determines a user presence UPD status, the parent monitor device may not assert a USB-C notification, and the host device may remain in the runtime power state.

Figure 10:
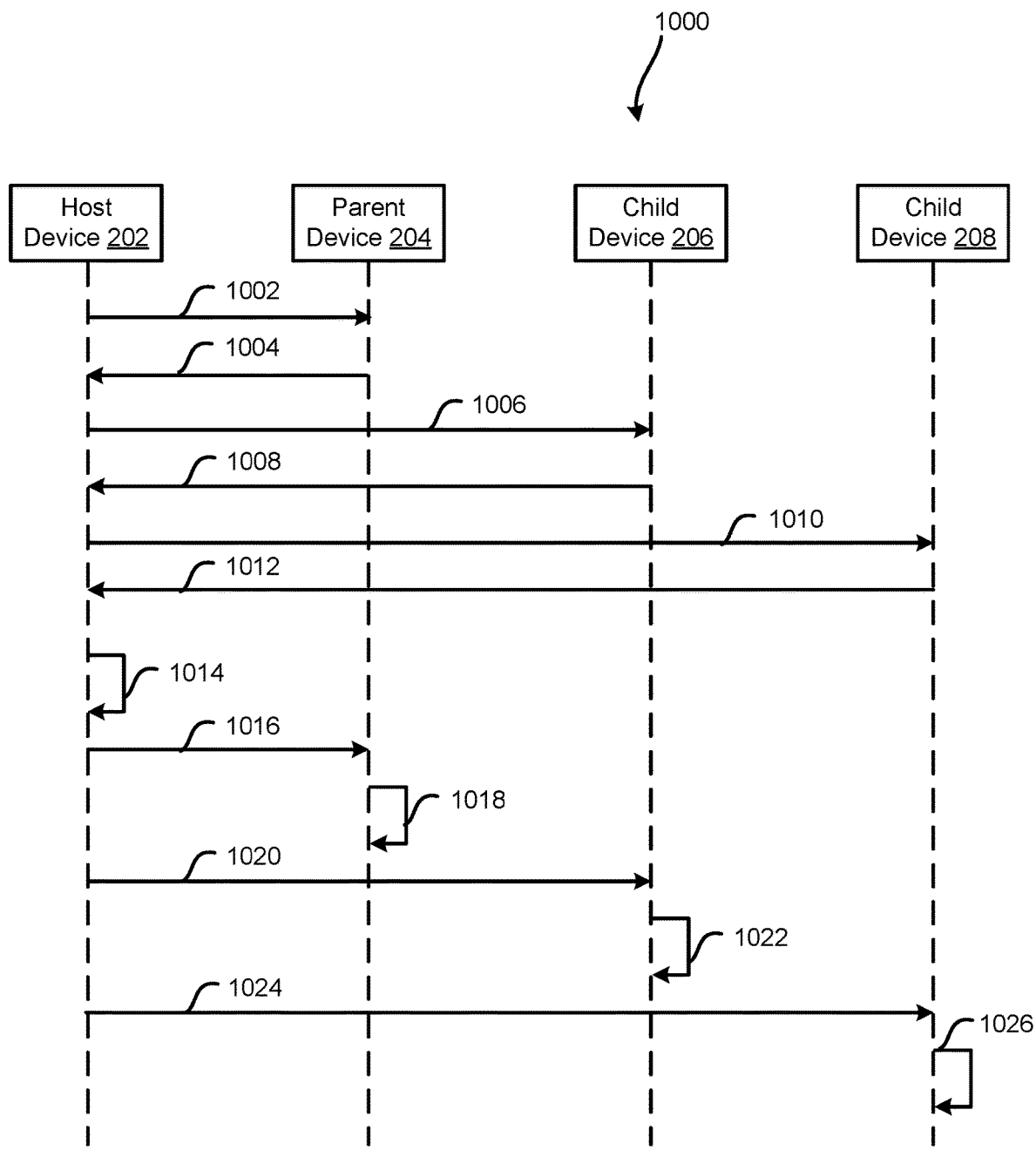
FIG. 10 is an operation flow for configuring consolidated user presence detection according to at least one embodiment of the current disclosure.

FIG. 10 illustrates an operation flow 1000 for configuring consolidated user presence detection according to at least one embodiment of the current disclosure. At step 1002, host device 202 queries monitor device 204 to receive information about the monitor device. At step 1004, monitor device 204 provides information, such as device status, to host device 202. In an example, the device status may be any suitable status including, but not limited to, an active status of monitor device 204. At step 1006, host device 202 queries monitor device 206 to receive information about the monitor device. At step 1008, monitor device 206 provides information, such as device status, to host device 202. At step 1010, host device 202 queries monitor device 208 to receive information about the monitor device. At step 1012, monitor device 208 provides information, such as device status, to host device 202.

At step 1014, host device 202 utilizes the status information from monitor devices 204, 206, and 208 to determine a topology for the monitor devices, to determine one or more policies for user detection, and assign one of the monitor devices as a parent device and the remaining monitor devices as child devices. Based on the determinations made by host device 202 at step 1014, the host device provides the policy information and a parent assignment to monitor device 204 at step 1016. At block 1018, monitor device 204 is configured as the parent monitor device, and stores the policy information in a memory of the monitor device. At step 1020, host device 202 provides the policy information and a child assignment to monitor device 206. At block 1022, monitor device 206 is configured as a child monitor device, and stores the policy information in a memory of the monitor device. At step 1024, host device 202 provides the policy information and a child assignment to monitor device 208. At block 1026, monitor device 208 is configured as a child monitor device, and stores the policy information in a memory of the monitor device.

Figure 11:
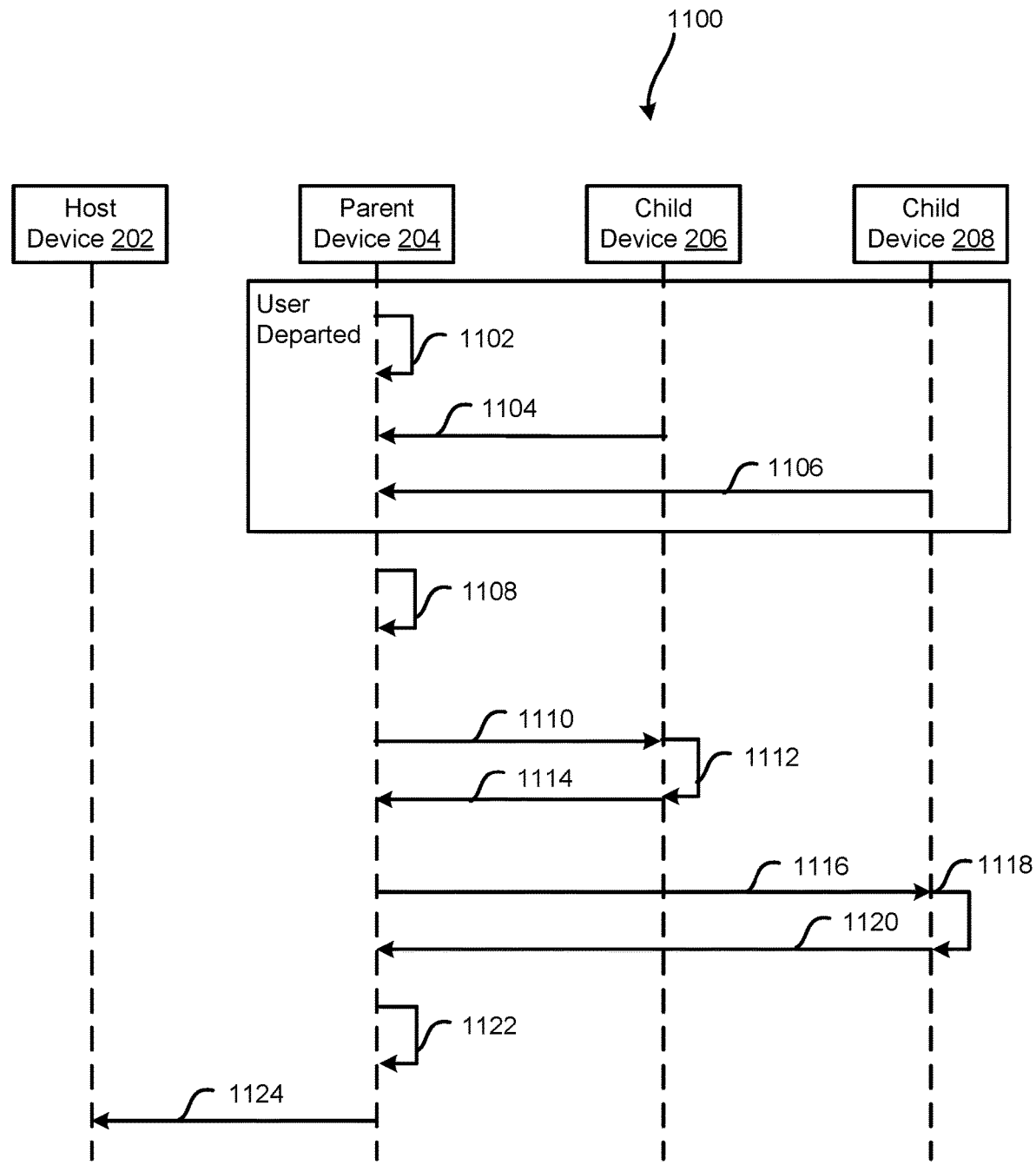
FIG. 11 is an operation flow for locking an information handling system in response to a user no longer being detected according to at least one embodiment of the current disclosure.

FIG. 11 illustrates an operation flow 1100 for locking an information handling system in response to a user no longer being detected according to at least one embodiment of the current disclosure. At step 1102, parent monitor device 204 determines that a user is no longer detected by the detect sensor of the parent monitor device. At step 1104, child monitor device 206 determines that a user is no longer detected by the detect sensor of the child monitor device, and provides a user not detected signal to parent device 204.

At step 1106, child monitor device 208 determines that a user is no longer detected by the detect sensor of the child monitor device, and provides a user not detected signal to parent device 204. In an example, in response to any one of steps 1102, 1104, and 1106 being performed, step 1108 is triggered.

At step 1108, parent monitor device 204 determines a current UPD status for the detect sensor associated with the parent monitor device. In an example, the current UPD status may indicate either a user presence or a user absence. At step 1110, parent monitor device 204 send a get status signal to child monitor device 206. In response, child monitor device 206 determines a current UPD status for the detect sensor associated with the child monitor device at step 1112. At step 1114, child monitor device 206 provides the current UPD status as either user absence or user presence to parent monitor device 204.

At step 1116, parent monitor device 204 send a get status signal to child monitor device 208. In response, child monitor device 208 determines a current UPD status for the detect sensor associated with the child monitor device at step 1118. At step 1120, child monitor device 208 provides the current UPD status as either user absence or user presence to parent monitor device 204. At step 1122, parent monitor device 204 consolidates the UPD statuses from all monitor devices 204, 206, and 208, and compares the consolidated UPD status to the policy information. If the comparison of the consolidated UPD status and the policy information results in a determination that the UPD status is user absence, parent device 204 provides a USB-C command to host device 202 at step 1124. In an example, the USB-C command may cause host device 202 to transition from a runtime power state to a lower power sleep/hibernate power state. In certain examples, parent monitor device 204 may provide the USB-C command only a single time or may provide the command at a particular interval. Host device 202 may continuously be in a receive state to look for the USB-C command.

Figure 12:
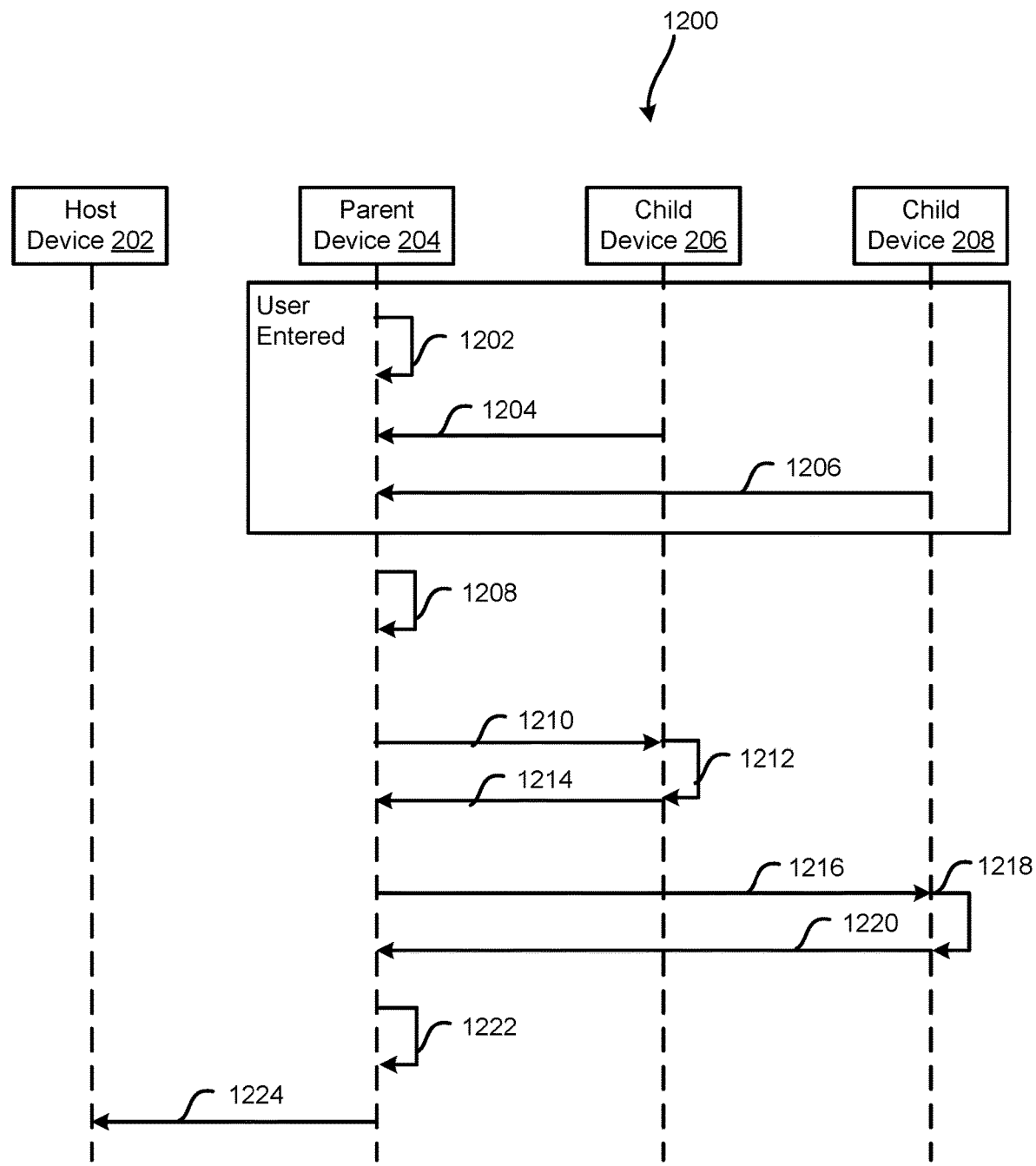
FIG. 12 is an operation flow for waking an information handling system in response to a user being detected according to at least one embodiment of the current disclosure The use of the same reference symbols in different drawings indicates similar or identical items.

FIG. 12 illustrates an operation flow 1200 for waking an information handling system in response to a user being detected according to at least one embodiment of the current disclosure. In an example, operation flow 1200 begins with no user being detected and host device 202 being in an MS power state or a S4/S5 power state. At step 1202, parent monitor device 204 determines that a user is detected by the detect sensor of the parent monitor device. At step 1204, child monitor device 206 determines that a user is detected by the detect sensor of the child monitor device, and provides a user detected signal to parent device 204. At step 1206, child monitor device 208 determines that a user is detected by the detect sensor of the child monitor device, and provides a user detected signal to parent device 204. In an example, in response to any one of steps 1202, 1204, and 1206 being performed, step 1208 is triggered.

At step 1208, parent monitor device 204 determines a current UPD status for the detect sensor associated with the parent monitor device. In an example, the current UPD status may indicate either a user presence or a user absence. At step 1210, parent monitor device 204 send a get status signal to child monitor device 206. In response, child monitor device 206 determines a current UPD status for the detect sensor associated with the child monitor device at step 1212. At step 1214, child monitor device 206 provides the current UPD status as either user absence or user presence to parent monitor device 204.

At step 1216, parent monitor device 204 send a get status signal to child monitor device 208. In response, child monitor device 208 determines a current UPD status for the detect sensor associated with the child monitor device at step 1218. At step 1220, child monitor device 208 provides the current UPD status as either user absence or user presence to parent monitor device 204. At step 1222, parent monitor device 204 consolidates the UPD statuses from all monitor devices 204, 206, and 208, and compares the consolidated UPD status to the policy information. If the comparison of the consolidated UPD status and the policy information results in a determination that the UPD status is user presence, parent device 204 provides a USB-C notification to host device 202 at step 1224. In an example, the USB-C notification may cause host device 202 to transition from a low power state to a higher power state, such as a runtime power state.

Referring back to FIG. 1, the information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a processor or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   a host device including a processor; and
   a plurality of monitor devices to communicate with the processor of the host device, each of the monitor devices including a different presence detect sensor, one of the monitor devices to be configured as a parent monitor device;
   the parent monitor device to:
      based on a consolidated current user presence detect (UPD) status from all of the monitor devices and based on a UPD policy, set a current user status as either a user absence or a user presence; and
      in response to the processor being in a low power state and the current user status being the user presence, provide a wake notification to the host device.

2. The information handling system of claim 1, in response to the processor being in a low power state and the current user status is the user absence, provide a low power idle command to the child monitor devices.

3. The information handling system of claim 1, in response to the processor being in a run power state and the current user status is the user absence, provide a user absence notification to the processor.

4. The information handling system of claim 1, in response to the wake notification, the processor to perform a wake process, and to initiate a login operation.

5. The information handling system of claim 1, when the UPD policy indicates a low security level, the parent device to set the current user status as user presence based on at least one of the monitor devices detects a user.

6. The information handling system of claim 1, when the UPD policy indicates a medium security, the parent device to set the current user status as user presence based on any two of the monitor devices detect a user.

7. The information handling system of claim 1, wherein communication between successive monitor devices and communication between one or the monitor devices and the host device is via a universal serial bus (USB) communication.

8. The information handling system of claim 1, wherein the monitor devices are connected in a daisy chain configuration.

9. A method comprising:
setting, by a processor of a host device, one of a plurality of monitor devices as a parent monitor device;
based on a consolidated current user presence detect (UPD) status from all of the monitor devices and based on a UPD policy, setting, by the parent monitor device, a current user status as either a user absence or a user presence; and
in response to the processor being in a low power state and the current user status being the user presence, providing a wake notification to the host device.

10. The method of claim 9, further comprising:
in response to the processor being in a low power state and the current user status is the user absence, providing a low power idle command to the child monitor devices.

11. The method of claim 9, further comprising:
in response to the processor being in a run power state and the current user status is the user absence, providing a user absence notification to the processor.

12. The method of claim 9, further comprising:
in response to the wake notification:
performing, by the processor, a wake process; and
initiating a login operation.

13. The method of claim 9, when the UPD policy indicates a low security level, the parent device to set the current user status as user presence based on at least one of the monitor devices detects a user.

14. The method of claim 9, when the UPD policy indicates a medium security, the parent device to set the current user status as user presence based on any two of the monitor devices detect a user.

15. The method of claim 9, wherein communication between successive monitor devices and communication between one or the monitor devices and the host device is via a universal serial bus (USB) communication.

16. The method of claim 9, wherein the monitor devices are connected in a daisy chain configuration.

17. A non-transitory computer-readable medium including code that when executed performs a method, the method comprising:
setting, by a processor of a host device, one of a plurality of monitor devices as a parent monitor device;
based on a consolidated current user presence detect (UPD) status from all of the monitor devices and based on a UPD policy, setting, by the parent monitor device, a current user status as either a user absence or a user presence; and
in response to the processor being in a low power state and the current user status being the user presence, providing a wake notification to the host device.

18. The non-transitory computer-readable medium of claim 17, wherein the method further comprises:
in response to the processor being in a low power state and the current user status is the user absence, providing a low power idle command to the child monitor devices.

19. The non-transitory computer-readable medium of claim 17, wherein when policy indicates a medium security, the method further comprises:
setting the current user status as user presence based on any two of the monitor devices detect a user.

20. The non-transitory computer-readable medium of claim 17, wherein communication between successive monitor devices and communication between one or the monitor devices and the host device is via a universal serial bus (USB) communication.

* * * * *